(12) United States Patent
Hao et al.

(10) Patent No.: US 10,423,416 B2
(45) Date of Patent: Sep. 24, 2019

(54) AUTOMATIC CREATION OF MACRO-SERVICES

(71) Applicant: International Business Machines Corporation, Armonk, NY (US)

(72) Inventors: Bi Bo Hao, Beijing (CN); Wen Sun, Beijing (CN); Yi Qin Yu, Beijing (CN); Guo Tong Xie, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 15/834,554

(22) Filed: Dec. 7, 2017

(65) Prior Publication Data
US 2019/0179638 A1  Jun. 13, 2019

(51) Int. Cl.
*G06F 9/30* (2018.01)
*G06F 8/30* (2018.01)
*G06F 16/903* (2019.01)
*G06F 16/901* (2019.01)

(52) U.S. Cl.
CPC .............. *G06F 9/3017* (2013.01); *G06F 8/30* (2013.01); *G06F 16/903* (2019.01); *G06F 16/9024* (2019.01)

(58) Field of Classification Search
CPC .... G06F 9/3017; G06F 8/30; G06F 17/30958; G06F 17/30964
See application file for complete search history.

(56) References Cited

U.S. PATENT DOCUMENTS

| | | | |
|---|---|---|---|
| 8,230,411 B1* | 7/2012 | Vorbach | G06F 8/433 717/156 |
| 9,286,329 B2 | 3/2016 | Svarovsky et al. | |
| 2006/0085533 A1* | 4/2006 | Hussain | G06F 17/30985 709/223 |
| 2007/0061176 A1 | 3/2007 | Gress et al. | |
| 2007/0163090 A1 | 7/2007 | Moyer et al. | |
| 2009/0282309 A1* | 11/2009 | Yue | H04L 1/1887 714/748 |
| 2009/0327888 A1 | 12/2009 | Woolf et al. | |
| 2015/0254322 A1 | 9/2015 | Ma et al. | |
| 2016/0196132 A1* | 7/2016 | Searle | H04L 41/082 717/173 |

OTHER PUBLICATIONS

Mindy Wang, "How Variable-Dependent Macros Can Help You," SESUG, 2011, 8 pages.
"Reusable Excel Macro for Data Analysis," [Accessed Online Oct. 9, 2017] https://technology-risk-management.com/blog/reusable-excel-macro-for-data-analysis/.

* cited by examiner

*Primary Examiner* — Viva Miller
(74) *Attorney, Agent, or Firm* — Patterson + Sheridan, LLP

(57) ABSTRACT

This disclosure provides a computer-implemented method for automatically creating a macro-service. The method includes: converting source code of an analytic program that includes a set of operation units into a graph representation. Each of the set of operation units performs at least an operation to a data object, and the method further includes performing a query associated with the macro-service on the graph representation to determine a subset of the graph representation. The method further includes generating code for the macro-service based on the determined subset of the graph representation.

20 Claims, 5 Drawing Sheets

AUTOMATIC CREATION OF MACRO-SERVICES

BACKGROUND

The present invention relates to the field of data analytics, and more specifically, to a computer-implemented method, a system and a computer program product for automatically creating macro-services.

Nowadays, many analytics tasks are conducted by writing code in an interactive manner by virtue of the evolution of analytics tools from GUI-based tool like Excel/SPSS to interactive analytic tools such as IBM Data Science® Experience. The interactive analytic tools enable data scientists to develop code to interactively analyze data with more flexibility.

In structured data analytics tasks, data scientists usually develop ad-hoc code to solve analytic problems. The ad-hoc code is specific to a particular analytic task and always varies upon changes of demands. Much of the code is repetitive and lacks reusability. When turn to another similar analytics task, data scientist usually copy, paste and tweak code to accomplish very similar tasks.

SUMMARY

At least one objective of at least one embodiment of the present disclosure aims at improving the analytics code reusability and automatically creating a macro-service from a previous analytics workflow.

According to one embodiment of the present disclosure there is provided a method for automatically generating a macro-service. The method includes converting source code of an analytic program that includes a set of operation units into graph representation. Each of the set of operation units performs at least an operation to a data object. The method further includes performing a query associated with the macro-service on the graph representation to determine a subset of the graph representation. The method further includes generating code for the macro-service based on the determined subset of the graph representation.

According to another embodiment of the present disclosure, there is provided a system for automatically creating macro-services. The system includes one or more processors and a memory coupled to at least one of the one or more processors. The system further includes a set of computer program instructions stored in the memory and executed by at least one of the one or more processors in order to perform an action of converting source code of an analytic program, which includes a set of operation units, into a graph representation. Each of the set of operation units performs at least an operation to a data object. The system further includes a set of computer program instructions stored in the memory and executed by at least one of the one or more processors in order to perform an action of performing a query associated with the macro-service on the graph representation to determine a subset of the graph representation. The system further includes a set of computer program instructions stored in the memory and executed by at least one of the one or more processors in order to perform an action of generating code for the macro-service based on the determined subset of the graph representation.

According to a further embodiment of the present disclosure, there is provided a computer program product for automatically creating a macro-service. The computer program product includes a computer readable storage medium having program instructions embodied therewith. The program instructions being executable by a device to perform a method. The method includes converting source code of an analytic program that includes a set of operation units into graph representation. Each of the set of operation units performs at least an operation to a data object. The method further includes performing a query associated with the macro-service on the graph representation to determine a subset of the graph representation. The method further includes generating code for the macro-service based on the determined subset of the graph representation.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, where the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

Figure 1:
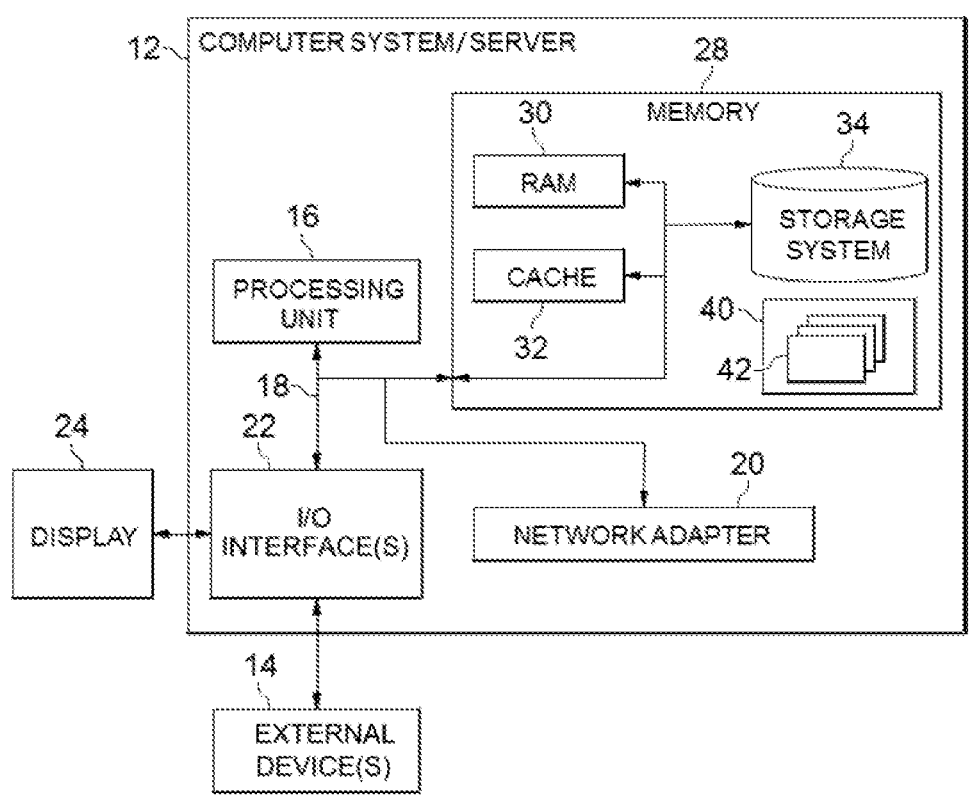
FIG. 1 illustrates an exemplary computer system which can implement at least one of the embodiment of the present disclosure.

Referring now to FIG. 1, in which an exemplary computer system/server 12 which is applicable to implement the embodiments of the present disclosure is shown. FIG. 1 is also adapted to depict an illustrative example of a portable electronic device such as a communication device which is applicable to implement the embodiments of the present disclosure. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the present disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the present disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

A macro-service is a reusable and deployable set of operations to accomplish a specific analysis task. The macro-service can be extracted from already existing, valuable analytics code from data scientists. Code for a macro-service may be in the form of source code, objective code or any other form of codes written in any combination of one or more programming languages that can be executed to implement the specific analysis task. In the code for a macro-service, only part of data dependencies lying within the set of operations is exposed to users. A macro-service may be used similarly to e.g. a method or a function. By using the code for a macro-service, data scientists can save time on writing code to analyze data.

To avoid writing code from scratch, one has to read/understand previous analytic workflow code written by others, and then extract (copy/paste) code segment related to his task to his program, and tweak the code to make the code run properly. In this process, finding related code segment and resolving data/variable dependencies are usually very tedious and time-consuming work, especially when the code is very long. Besides, this process is also error-prone for it completely depends on human labor.

Therefore, there is a need for a solution of automatically creation of macro-services from existing data analytics workflow.

Figure 2:
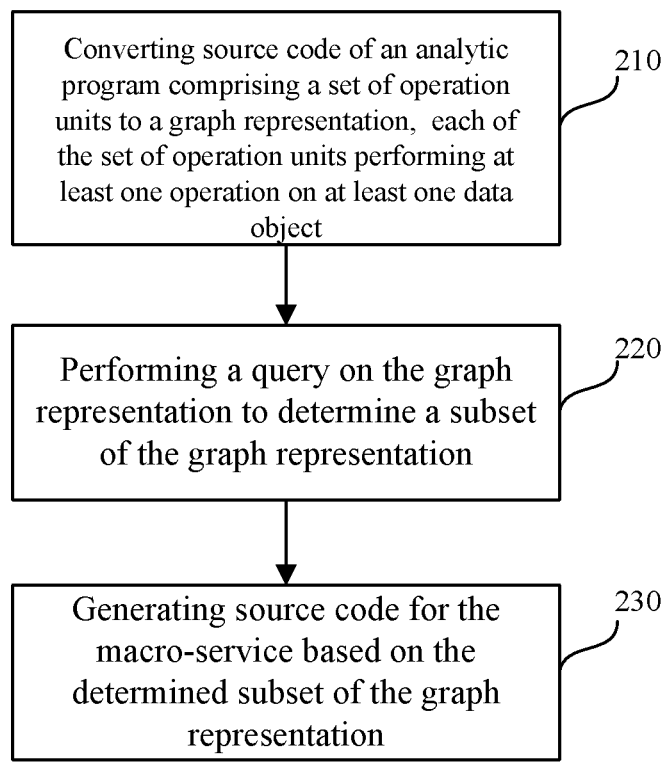
FIG. 2 illustrates a flowchart for a computer-implemented method for automatically creating macro-services according to at least one embodiment of the present disclosure.

With reference now to FIG. 2, FIG. 2 is a flowchart illustrating a computer-implemented method for automatically creating a macro-service according to an embodiment of the present disclosure. As shown in FIG. 2, the computer-implemented method for automatically creating a macro-service includes a source code to graph representation converting step 210, a query step 220, and a macro-service generating step 230. The method in FIG. 2 may be performed on a regular or irregular basis automatically by a computer system, or in response to a user input when the user seeks to find or generate a specific macro service based on existing source code. Alternatively, the method in FIG. 2 can be performed when a user uses an editor to view source code of an existing analytics program or executes the existing analytics program in a runtime environment. Hereinafter, respective steps of the method for automatically creating macro-services in FIG. 2 will be explained in detail.

Specifically, in the source code to graph representation converting step 210, source code of an analytics program including a set of operation units is converted to a graph representation, where each of the set of operation units performs at least an operation to a data object. The analytics program may include, for example, code segments that are written by experts, other users or the user himself, code segments in package documentation, and code segments on websites on the Internet. For example, the analytic program may be a notebook file editable in Jupyter Notebook®, which contains a plurality of pre-defined cells (code segments). Each pre-defined cell may be referred to as an operation unit that performs at least an operation to a data object.

The data object of an operation unit includes at least one of input data to be processed by the operation unit, output data after being processed by the operation unit, input parameters involved in the processing for controlling and output values produced in the processing. In the field of data analytics, the input/output data is normally organized in a table of database or a data structure. In many programming languages (e.g., R language) or SDKs (such as Python pandas and Apache Spark®), the data structure for the input/output data may be such as a DataFrame used to accommodate structured or semi-structured data. Hereinafter, for ease of description, DataFrame is used to refer to input and/or output data collectively, and accordingly input DataFrame refers to input data, and output DataFrame refers to output data. It should be appreciated that the description directed to DataFrame also applies to other data structure of the input and/or output data. In one embodiment, input parameters and/or output values may be primitives or its combination of list or map. In another embodiment, some operation units may have additional information, such as notebook cell id, description, etc.

In one embodiment of the present disclosure, depending on whether a DataFrame is changed or read-only, operation of an operation unit may be divided into three catalogs: logical control operation, read-only operation and modification operation. Logical control operation means that no read or write operation is performed on a DataFrame. For some logical control operations, DataFrames are not necessary and they may have only one of input parameters or output values. Read-only operation would only read a DataFrame, without changing it. For modification operation, a DataFrame is input and a modified DataFrame is output. An example of operation unit with modification operation may be:

```
select_columns = [
    u'EXPLORYS_PATIENT_ID', u'STD_STATUS',
    u'STD_GENDER', u'STD_LANGUAGE', u'STD_RELIGION',
    u'BIRTH_YEAR', u'DEATH_YEAR', u'IS_DECEASED'
]
ddf_demo = ddf_demo[select_columns]
```

In the above example, the modification operation is to project selected columns of table recording information of patients into output DataFrame ddf_demo'. The input parameter is a list of string indicating names of columns to be selected, i.e., [u'EXPLORYS_PATIENT_ID', u'STD_STATUS', u'STD_GENDER', u'STD_LANGUAGE', u'STD_RELIGION', u'BIRTH_YEAR', u'DEATH_YEAR', u'IS_DECEASED'] and there are no output values other than the output DataFrame. That is, in the above code segment, data in the DataFrame ddf_demo is changed.

It should be noted that the aforementioned catalogs of operations are only given as examples. In other embodiments, more catalogs or other method of division may also be defined by a user.

In one embodiment of the present disclosure, as a result of the source code to graph representation converting step 210, the source code is converted into a graph representation. The graph representation is an abstract data structure originated from the undirected graph and the directed graph concepts from mathematics, especially in the field of graph theory. Like the undirected graphs and the directed graphs, graph representation also includes nodes and edges between the nodes, and thus is particularly useful in describing relationships or connections between objects. As an abstract data structure, a graph representation may be embodied with various data structures such as adjacency list, adjacency matrix, and incident matrix. If desired, a graph representation may be visualized in a human-machine interaction interface with various shapes representing the nodes and the arrows representing the edges, so that a user can observe the relationships or connections in an intuitive way. But a graph representation may not be visualized. In that sense, a graph representation is different from visual graphs, charts or maps that are commonly drawn or shown. It should also be noted that, although the graph representation is originated from the undirected graph and the directed graph concepts, it is not limited to them and can have more features.

According to one or more embodiments of the present disclosure, in the graph representation, a plurality of nodes are provided, each representing operation of a respective one of the set of operation units. For any two of the plurality of nodes in the graph representation, if there is dependency of data objects for the respective operation units of the two nodes, a directed edge is provided between the two nodes. Dependency of data objects for two operation units means that a first of the two operation units is input with data objects that are output by a second of the two operation units, that is, there is a route or flow of data objects between the two operation units, which thereby can be represented in the graph representation as a directed edge. In one embodiment of the present disclosure, type of a node in the graph representation may be further determined based on the catalog of the operation of the respective operation unit. In one embodiment of the present disclosure, different types of nodes in the graph representation may be characterized with different shapes, colors or sizes. Other forms of characterization may be adopted in other embodiments so long as they can be used to distinguish different catalogs of operations.

Now referring back to FIG. 2, in the query step 220, a query associated with the macro-service is carried out on the graph representation to determine a subset of the graph representation. The query may be performed in response to a user input, or by a computer system automatically based on a predetermined rule. A user input can be key words entered or selections on the graph representation through any state of art human-machine interaction interfaces. Alternatively, when the query is performed by a computer system based on a predetermined rule, no manual intervention is necessary to trigger the query.

Depending on the macro-service desired, the query may be based on one or more of the following items of the set of operation units in the original source code of the analytics program: name of a data object of the set of operation units, a semantic attribute of a data object, features of a data object (e.g., as discussed herein), and catalog of an operation of the set of operation units. For example, as described above, the data object may be a DataFrame when querying by name of a DataFrame, the results would be any element (including node and/or directed edge) in the graph representation which are associated with the DataFrame having that particular name. Specifically, according to one embodiment of the present disclosure, in the graph representation providing a plurality of nodes to represent operations units in the original source code of a analytics program and a plurality of directed edges to represent dependency of data object between these operation units, as described above, when querying by a particular DataFrame name of e.g. "df_A", the query results would be a collection of all the directed edges representing the DataFrame "df_A" and nodes associated with these directed edges.

The semantic attribute of a data object refer to what the data object, such as a DataFrame, an input parameter or an output value of an operation unit stands for in the physical world. In the field of clinical data analytics, for example, exemplary semantics of data objects may be diagnosis code, medicine name, laboratory test name, etc., which may be included in a data object and used to query on a graph representation to determine a subset of the graph representation. For example, if a medicine's name is used for a query and is found in a DataFrame, a directed edge representing the dependency of this DataFrame and nodes associated with the directed edge will be determined as result of the query.

Querying by features of a data object, preferably features of a DataFrame, may include detecting nodes in the graph representation whose corresponding operation units have data quality change, data schema change or data quantity change, for example. For a DataFrame, it is like a table having columns and may have stored many data records. Data quality change to a DataFrame is for example filling in an empty value. Data schema change to a DataFrame can be for example adding a column to the DataFrame or deleting a column from the DataFrame. Data quantity change to a DataFrame is for example extracting some data from the DataFrame. For example, in one embodiment of the present disclosure, the query is to find a DataFrame whose feature(s) has changed or changed by a predetermined degree. Accordingly, a directed edge representing the dependency of this DataFrame and nodes associated with the directed edge will be determined as result of the query.

In another embodiment of the present disclosure, the query may also be performed based on catalog of an operation. The catalog of an operation can be one of: logical control operation, read-only operation and modification operation, as already discussed. For example, a user may want to retrieve all the operations that modify an input DataFrame. As another example, another user may desire to find all the operations that only store an input DataFrame or display the input DataFrame, i.e., read-only operations.

After the query is performed, a subset of the graph representation is determined based on the query results. In one embodiment of the present disclosure, as completion of the determination, the subset of the graph representation is marked or flagged. For example, when the graph representation is visualized in a human-machine interaction interface, the determined subset may be identified by way of highlighting the subset as query result. Alternatively, only the subset as the query result is shown in the visualized graph representation and other parts of the graph representation are hidden.

Now referring back to FIG. 2, in the macro-service generating step 230, code for the macro-service is generated based on the determined subset of the graph representation. Data dependencies between operation units corresponding to the determined subset of the graph representation are resolved so as to determine variables. E.g. at least one variable, that is/are to be exposed for the macro-service. In one embodiment of the present disclosure, resolving the data dependencies includes: determining that a set of data objects in the corresponding operation units of the determined subset of the graph representation is used without definitions within the corresponding operation units, and exposing the determined set of data objects in the code for the macro-service. Specifically, for the set of operation units corresponding to the determined subset of the graph representation, variables (or data objects) that are used without definitions within the set of operation units are exposed outside of the macro-service to the user, while other variables that are defined or generated and only used within the set of operations are capsulated so that they are transparent to the user. Variables as stated herein include input DataFrame, output DataFrame, input parameters and output values. Constant variables as a special kind of input parameters are preferably exposed to user during the process of resolving data dependencies, e.g. resolving at least one data dependency, so that the user is able to gain better control of the generated macro-service.

After resolving data dependencies to determine variables that are to be exposed to user, code for the macro-service is automatically generated. Code for the macro-service may include name and definition for the macro-service. The user may be able to change the name for the macro-service or add comments information for the macro-service so that the macro-service is easier to be identified and located. The code for the macro-service is capsulated as a function or method with the determined variables as parameters of the function or method. In this function or method, source code of the set of operation units corresponding to the subset of the graph representation as query result is capsulated. The generated macro-service may be used globally or locally as desired. In one embodiment of the present disclosure, the definition for the macro-service is stored in the interactive development environment so that the macro-service can be reused any time, just like any common functions or operations. In another embodiment of the present disclosure, the code for the macro-service is generated and inserted into a program that a user is writing or editing when the user desire to use such a macro-service.

Figure 3:
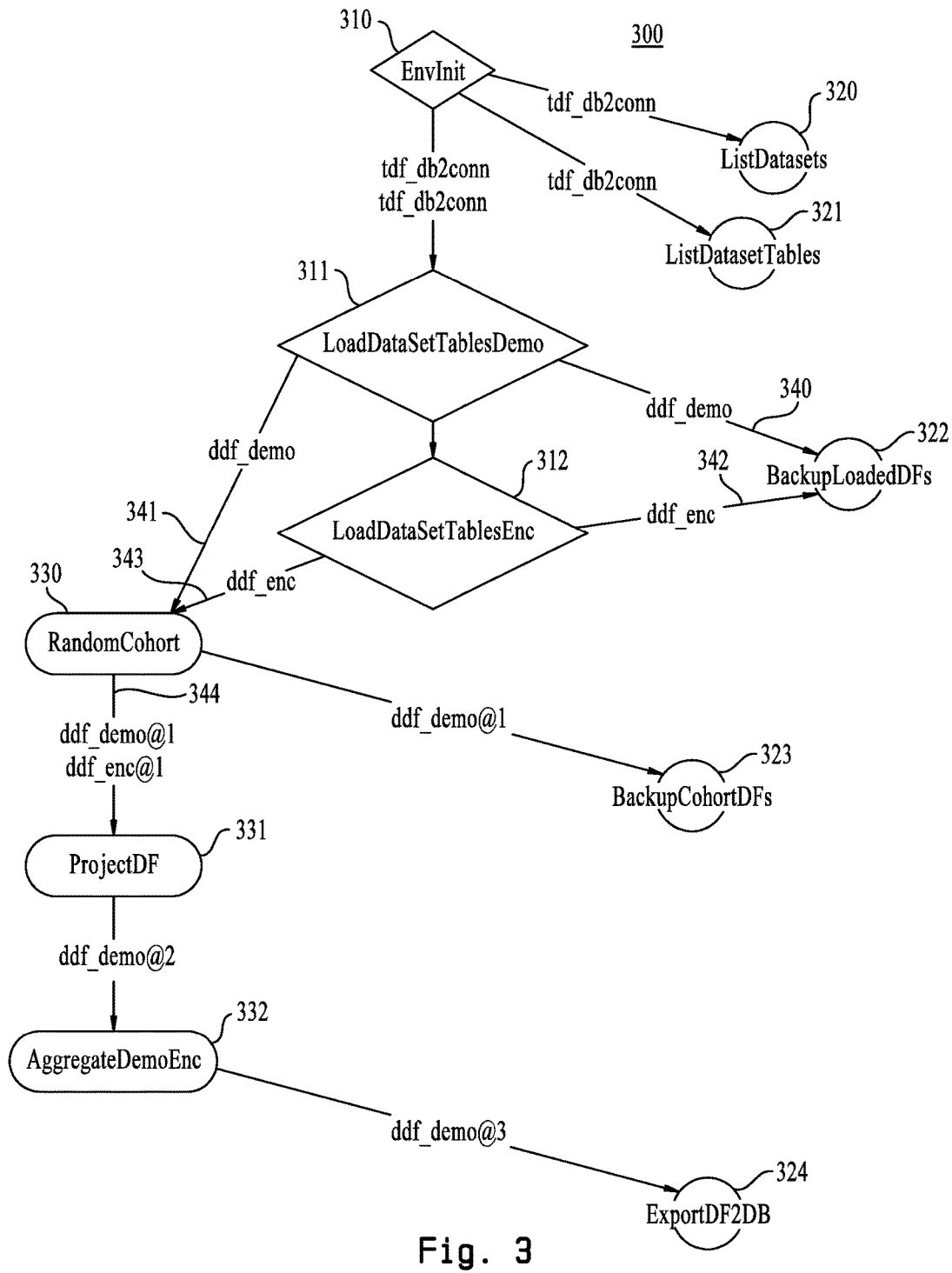
FIG. 3 illustrates an exemplary screen of a graph representation that is generated in accordance with at least one embodiment of present the disclosure.

FIG. 3 shows an exemplary screen of graph representation that is generated in accordance with one embodiment of the present disclosure. In the graph representation 300, operation units in the original source code of an analytics program has been converted into nodes with different shapes for different catalogs of operations. As shown in FIG. 3, nodes 310, 311 and 312 are in the shape of diamonds to indicate that the operations of the corresponding operation units are logical control operations that do not change or modify their input DataFrames; nodes 320, 321, 322, 323 and 324 are in the shape of circles to indicate that the operations of their corresponding operation units are read-only operations; nodes 330, 331 and 332 are in the shape of rounded rectangles to indicate that their corresponding operations change or modify their input DataFrames. Shapes of the nodes are only used as an example. In other embodiments, other attributes of the nodes such as colors, sizes and etc. may also be utilized to represent different catalogs of the operations. For nodes 310 and 311, there is a data dependency therebetween, since the corresponding operation "EnvInit" of node 310 generates a data object "tdf_db2conn" that is used by the corresponding operation "LoadDataSetTablesDemo" of node 311. A directed edge pointing to node 311 from node 310 is provided to indicate such a data dependency. Other directed edges shown in FIG. 3 are provided in a similar way. Particularly, node 311 is input with the data object "tdf_db2conn" from node 310 and outputs DataFrame "ddf_demo" respectively to node 322 for backup (shown as edge 340) and to node 330 for cohort operation (shown as edge 341), node 312 is also input with the data object "tdf_db2conn" from node 310 but outputs different DataFrame "ddf_enc" respectively to node 322 for backup (shown as edges 342) and to node 330 for cohort operation (shown as edge 343). Node 330 is input with two DataFrames "ddf_demo" and "ddf_enc", makes some modifications and outputs modified DataFrames "ddf_demo@1" and "ddf_enc@1" to node 331 (shown as edge 344).

Figure 4:
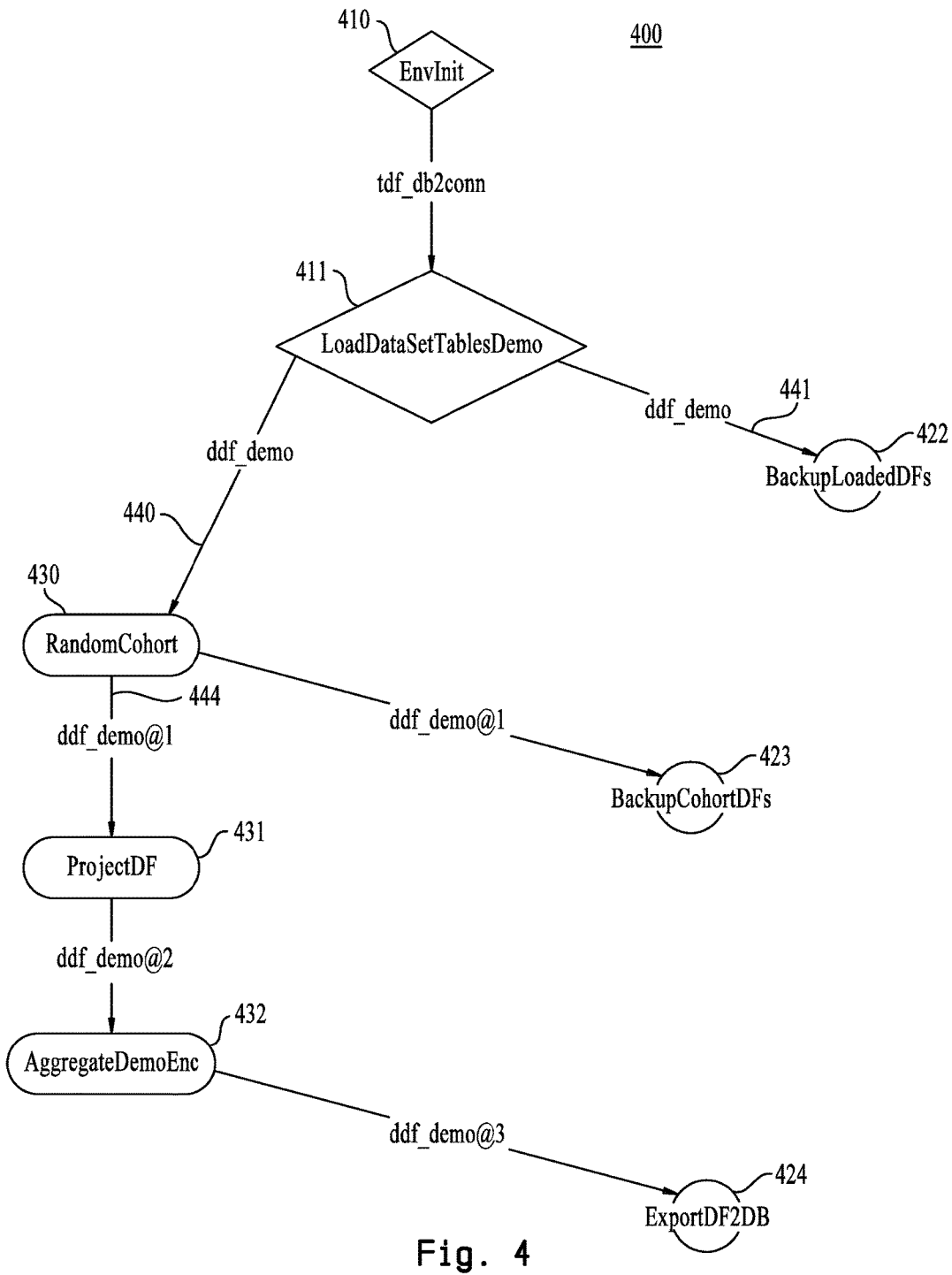
FIG. 4 illustrates exemplary subset of a graph representation as shown in FIG. 3 and determined by a query in accordance with at least one embodiment of the present disclosure.

FIG. 4 shows an exemplary subset of graph representation as shown in FIG. 3 determined by a query according to one embodiment of the present disclosure. In the subset of graph representation 400, nodes 410, 411, 422, 423, 424, 430, 431, 432 are similar to nodes 310, 311, 322, 323, 324, 330, 331, 332 in FIG. 3, and edges 440, 441 are similar to edges 340, 341 in FIG. 3. In the example of FIG. 4, the query is based on the name of the data object, which is "ddf_demo" in this example. The query result is a collection of all the elements (including nodes and directed edges) in the graph representation that is associated with the data object with the name "ddf_demo". For example, nodes 411, 422 and 430 that directly uses the DataFrame "ddf_demo" as input or output are included in the query result. Elements that are associated with modified version of the original DataFrame "ddf_demo" (such as "ddf_demo@1", "ddf_demo@2" and "ddf_demo@3" in FIG. 4) are also included in the query result. For example, nodes 423, 424, 431 and 432 that are input with data objects modified from DataFrame "ddf_demo" are also shown in the resultant subset of graph. Edge 444 is different from edge 344 in that edge 444 only represents dependency of DataFrame "ddf_demo@1" between nodes 430 and 431. Dependency of DataFrame "ddf_enc@1" between nodes 430 and 431 is filtered out in the query result. By querying based on the name of a data object, it helps concentrating on the processing flow of the particular data object and creating reusable code segments or a macro-service from the query result.

The subset of the graph representation based on the query result may be or may not be presented to a user. If presented, the subset of the graph representation may be highlighted in the original visualized graph representation. Alternatively, only the subset of the graph representation is shown and the remaining elements in the original visualized graph representation are hidden. For example, in FIG. 4, all the nodes and directed edges associated with DataFrame "ddf_enc" are hidden.

Figure 5:
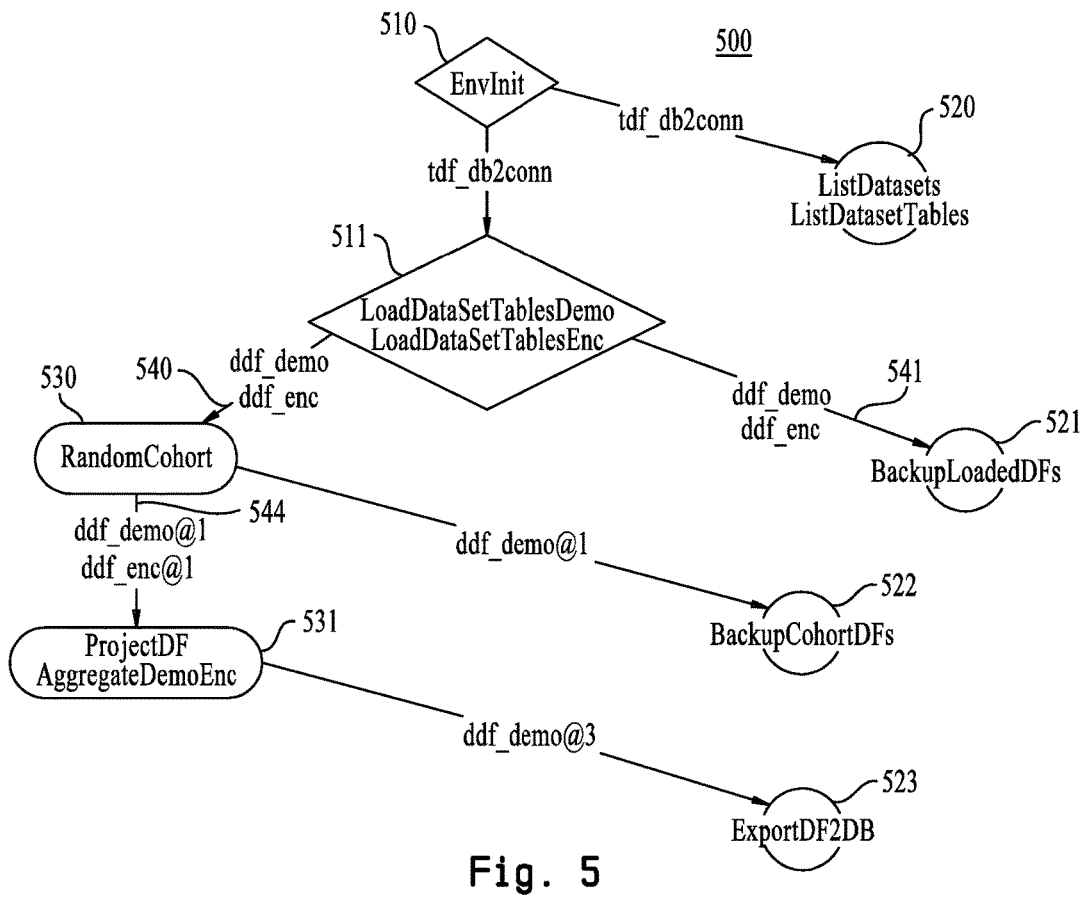
FIG. 5 illustrates an exemplary data dependency resolution for generating code for a macro-service based on a subset of the graph representation shown in FIG. 3 and in accordance with at least one one embodiment of the present disclosure.

FIG. 5 shows an exemplary data dependency resolution for generating code for a macro-service based on a subset of the graph representation shown in FIG. 3 according to one embodiment of the present disclosure. In the subset of graph representation 500, nodes 510, 521, 522, 523, 530 are similar to nodes 310, 321, 322, 323, 330 in FIG. 3 and edge 544 is similar to edge 344 in FIG. 3. Since a macro-service is in essence a set of operations for a specific task, merging a set of operation units and packaging them by resolving data dependencies in the set of operation units are helpful in generating the code for a macro-service.

One simple case for merging operations and resolving data dependencies, e.g. resolving at least one dependency, is merging one or more operations having the same catalog and sharing the same data object as their inputs. For example, as shown in FIG. 3, node 320 and node 321 indicate the same catalog of operation, i.e., read-only operation, and they both have the data object "tdf_db2conn" as an input. In FIG. 5, nodes 320 and 321 in FIG. 3 are merged as node 520, which still has "tdf_db2conn" as the input. Similarly, node 511 is composed from node 311 and node 312 which are both logical control operations and both have the data object "tdf_db2conn" as an input, but respectively outputs DataFrame "ddf_demo" and "ddf_enc". After merging operations and resolving data dependencies, node 511 now has two output data objects, i.e., DataFrame "ddf_demo" and "ddf_enc", as indicated by directed edges 540 and 541.

Another example for merging operations and resolving data dependencies is merging several successive operations of the same catalog among which output of each operation is processed by the operation following. For example, as shown in FIG. 3, node 331 and node 332 indicate the same catalog of operation, i.e., data modification operation, and node 332 is input with output of node 331. In FIG. 5, node 331 and node 332 in FIG. 3 are merged as node 531, which only uses input of node 331 (i.e., DataFrame "ddf_demo@1" and DataFrame "ddf_enc@1") as an input and output of node 332 (i.e., DataFrame "ddf_demo@3") as an output. The data dependency between nodes 331 and 332 is resolved and thus invisible from node 531.

Figure 6:
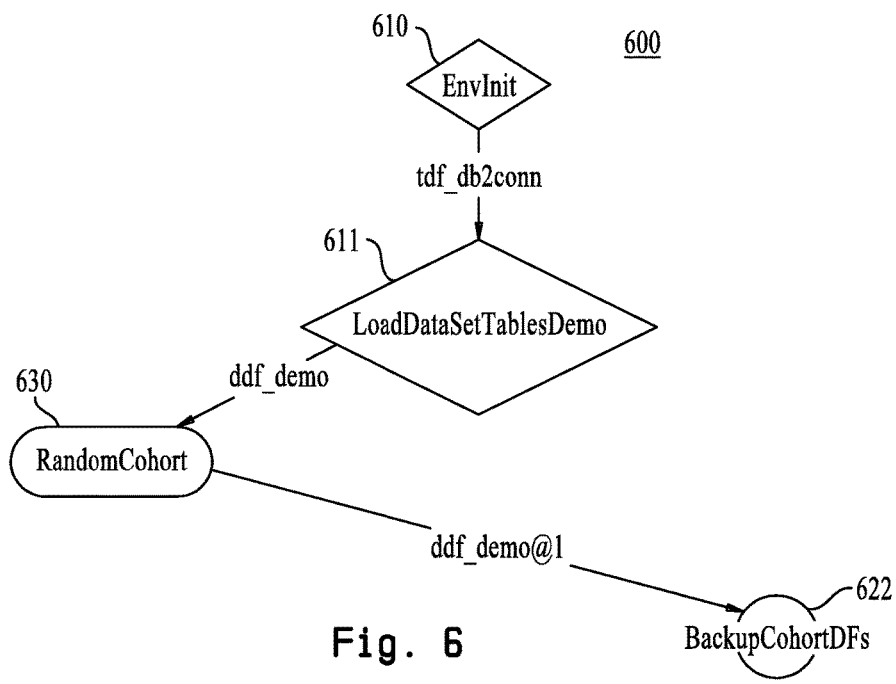
FIG. 6 shows another exemplary data dependency resolution for generating code for a macro-service based on a subset of the graph representation shown in FIG. 3 and in accordance with at least one embodiment of the present disclosure.

FIG. 6 shows another exemplary data dependency resolution for generating code for a macro-service based on a subset of the graph representation shown in FIG. 3 according to one embodiment of the present disclosure. In FIG. 6, a subset of the graph representation 600 is determined based on a query to show a complete and shortest workflow for cohort operation. The query may be based on name of operations, for example, to retrieve all the elements in FIG. 3 associated with a keyword "cohort". In the subset of graph representation 600, nodes 610, 611, 622 and 630 are similar to nodes 310, 311, 322 and 330 in FIG. 3. Nodes 630 and 622 are included in the query results because the names of their corresponding operations contain the keyword "cohort". Nodes 610 and 611 are also included in the query result because their corresponding operations work to provide an initial environment for operations of node 630. For example, the source code of the subset of graph representation 600 may be as follows:

```
#cohort construction and export data
db_con = f_db(db_param)
...
df_patients = f1(db_con, tb_name)
...
df_cohort = f2(df_patients, cohort_definitions)
...
r=f_bak(df_cohort, f_path)
```

Specifically, node 610 corresponds to the operation of f_db(db_param), which uses database parameters as an input parameter and output a database connection value, i.e., "tdf_db2conn" as shown in FIG. 6. Node 611 corresponds to the operation of f1(db_con, tb_name) which uses the database connection value output by f_db(db_param) and name of a dataset table as inputs and outputs a DataFrame, i.e. "ddf_demo" as shown in FIG. 6. Node 630 corresponds to the operation of f2(df_patients, cohort_definitions) which uses the DataFrame output by f1(db_con, tb_name) and some definition parameters for cohort as inputs and outputs a cohort DataFrame, i.e. "ddf_demo@1" as shown in FIG. 6. Node 622 corresponds to the operation of f_bak(df_cohort, f_path) which uses the cohort DataFrame output by f2(df_patients, cohort_definitions) and a file path as inputs.

When generating code for a macro-service based on the subset of graph representation 600, dependencies of data may be resolved in the following way: determining that a set of parameters such as db_param, tb_name, cohort_definitions and f_path are used in the subset 600 without definitions, and exposing the determined set of parameters to the user as input parameters of the macro-service. Generating code for a macro-service also includes generating a name for the macro-service. In this example, the generated code for the macro-service based on the subset 600 may be:

```
#macro-service to export a cohort
def f_macro_service(db_param, tb_name, cohort_definition, f_path):
    #auto resolved dependencies
    t1 = f_db(db_param)
    df_1 = f1(t1, tb_name)
    df_2 = f2(df_1, cohort_definition)
    return f_bak(df_2, f_path)
```

In the source code shown above, db_param is a parameter used to connect to a database, tb_name is a variable including name of a data table, cohort_definition is a parameter used to define a cohort operation, and f_path is a parameter that indicates a file path for backuping. These parameters db_param, tb_name, cohort_definition, and f_path are all exposed as input parameters of the generated macro_service to a user, because they are used without definitions in the source code of the subset of graph representation, and need to be assigned values from outside.

The code for the macro-service is generated automatically based on the subset 600. In one embodiment of the present disclosure, the code for the macro-service may be included in a system environment for the interactive development system, so that the generated macro-service can be used globally as other common functions or operations. In another embodiment of the present disclosure, the code for the macro-service is generated and inserted locally in the user's code segments so that the macro-service can be referred to and invoked locally.

In an embodiment of the present disclosure, there is provided a system for automatically creation of macro-services. The system includes one or more processors and a memory coupled to at least one of the one or more processors. The system further includes a set of computer program instructions stored in the memory and executed by at least one of the one or more processors in order to perform an action of converting source code of an analytic program including a set of operation units to a graph representation. Each of the set of operation units performs at least an operation to a data object. The system further includes a set of computer program instructions stored in the memory and executed by at least one of the one or more processors in order to perform an action of performing a query associated with the macro-service on the graph representation to determine a subset of the graph representation. The system further includes a set of computer program instructions stored in the memory and executed by at least one of the one or more processors in order to perform an action of generating code for the macro-service based on the determined subset of the graph representation.

In one embodiment of the system, where converting source code of the analytic program to the graph representation includes: providing a plurality of nodes in the graph representation, where each of the plurality of nodes representing operation of a respective one of the set of operation units; determining a type of each of the plurality of nodes based on a catalog of the operation of the respective operation unit; and for any two of the plurality of nodes, if there is dependency of one or more data objects for the respective operation units of the two nodes, providing a directed edge between the two nodes.

In one embodiment of the system, where the data object includes a DataFrame, and where the catalog of the operation includes read-only, modification or control logic with respect to the DataFrame.

In one embodiment of the system, where the query is performed based on at least one of: name of the data object, a semantic attribute of the data object, features of the data object (e.g., as discussed herein) and above), and the catalog of the operation.

In one embodiment of the system, where generating code for the macro-service based on the determined subset of the graph representation includes: merging more than one element in the determined subset of the graph representation.

In one embodiment of the system, where generating code for the macro-service based on the determined subset of the graph representation further includes: resolving dependencies of data objects in the determined subset of the graph representation.

In an embodiment of the present disclosure, there is provided a computer program product for automatically creating a macro-service. The computer program product includes a computer readable storage medium having program instructions embodied therewith. The program instructions being executable by a device to perform a method. The method includes converting source code of an analytic program including a set of operation units to a graph representation. Each of the set of operation units performs at least an operation to a data object. The method further includes performing a query associated with the macro-service on the graph representation to determine a subset of the graph representation. The method further includes generating code for the macro-service based on the determined subset of the graph representation.

In one embodiment of the computer program product, where converting source code of the analytic program to the graph representation includes: providing a plurality of nodes in the graph representation, where each of the plurality of nodes representing operation of a respective one of the set of operation units; determining a type of each of the plurality of nodes based on a catalog of the operation of the respective operation unit; and for any two of the plurality of nodes, if there is dependency of one or more data objects for the respective operation units of the two nodes, providing a directed edge between the two nodes.

In one embodiment of the computer program product, where the data object includes a DataFrame, and where the catalog of the operation includes read-only, modification or control logic with respect to the DataFrame.

In one embodiment of the computer program product, where the query is performed based on at least one of: name of the data object, a semantic attribute of the data object, and features of the data object (e.g., as discussed herein and above), and the catalogs of the operation.

In one embodiment of the computer program product, where generating code for the macro-service based on the determined subset of the graph representation includes: merging more than one element in the determined subset of the graph representation.

In one embodiment of the computer program product, where generating code for the macro-service based on the determined subset of the graph representation further includes: resolving dependencies of data objects in the determined subset of the graph representation.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for automatically creating a macro-service, the method comprising:
    converting, by a processor, pre-existing source code of an analytic program to accomplish a first analytic task comprising a first set of operation units into a graph representation, wherein each of the first set of operation units performs at least one first operation on a first data object;
    performing a query associated with the macro-service on the graph representation to determine a subset of the graph representation of the pre-existing code, the subset including the at least one first operation; and generating, by the processor, second code differing from the pre-existing source code for the macro-service based on the determined subset of the graph representation, wherein the macro-service comprises a reusable and deployable second set of operation units for performing at least one second operation on a second data object to accomplish a second analytic task differing from the first analytic task, wherein the at least one second operation of the second set of operations differs from the at least one first operation of the first set of operations; and deploying the second code on the processor.

2. The computer-implemented method according to claim 1, wherein converting pre-existing source code of the analytic program into the graph representation comprises:

providing a plurality of nodes in the graph representation, wherein each of the plurality of nodes represents an operation corresponding to at least one of the first set of operation units;

determining a type of each of the plurality of nodes based on a catalog of the operation corresponding to at least one of the first set of operation units; and for at least two of the plurality of nodes, if there is a dependency of one or more data objects for one or more respective operation units of the first set of operation units associated with the two nodes, providing a directed edge between the two nodes.

3. The computer-implemented method according to claim 2, wherein the one or more data objects includes a DataFrame, and wherein the catalog of the operation comprises at least one of i) a read-only operation, ii) a modification operation or iii) control logic with respect to the DataFrame.

4. The computer-implemented method according to claim 1, wherein the query is performed in response to at least one of i) a user input or ii) in accordance with a predetermined rule.

5. The computer-implemented method according to claim 1, wherein the query is performed based on at least one of: i) a name of the data object, ii) a semantic attribute of the data object, and iii) a catalog of the operation.

6. The computer-implemented method according to claim 1, wherein generating the second code for the macro-service based on the determined subset of the graph representation comprises:

merging more than one element in the determined subset of the graph representation.

7. The computer-implemented method according to claim 1, wherein generating the second code for the macro-service based on the determined subset of the graph representation further comprises:

resolving at least one dependency of at least one data object in the determined subset of the graph representation.

8. The computer-implemented method according to claim 7, wherein resolving at least one dependency of at least one of the data objects comprises:

determining that a set of data objects in and corresponding to one or more operation units of the determined subset of the graph representation are used without definitions within the corresponding one or more operation units; and exposing the determined set of data objects as input parameters for the macro-service.

9. A system for automatically creating a macro-service, comprising:

one or more processors;

a memory coupled to at least one of the one or more processors;

a set of computer program instructions stored in the memory and executed by at least one of the one or more processors in order to perform actions of:

converting pre-existing source code of an analytic program to accomplish a first analytic task comprising a first set of operation units into a graph representation, wherein each of the first set of operation units performs at least one first operation on a first data object;

performing a query associated with the macro-service on the graph representation to determine a subset of the graph representation of the pre-existing code, the subset including the first operation; and generating second code differing from the pre-existing source code for the macro-service based on the determined subset of the graph representation, wherein the macro-service comprises a reusable and deployable second set of operation units for performing at least one second operation on a second data object to accomplish a second analytic task differing from the first analytic task, wherein the at least one second operation of the second set of operations differs from the at least one first operation of the first set of operations; and deploying the second code on the processor.

10. The system according to claim 9, wherein converting source code of the analytic program to the graph representation comprises:

providing a plurality of nodes in the graph representation, wherein each of the plurality of nodes represents an operation corresponding to at least one of the first set of operation units;

determining a type of each of the plurality of nodes based on a catalog of the operation corresponding to at least one of the first set of operation units; and for at least two of the plurality of nodes, if there is a dependency of one or more data objects for one or more respective operation units of the first set of operation units associated with the two nodes, providing a directed edge between the two nodes.

11. The system according to claim 10, wherein the one or more data objects includes a DataFrame, and wherein the catalog of the operation comprises at least one of i) a read-only operation, ii) a modification operation or iii) control logic with respect to the DataFrame.

12. The system according to claim 9, wherein the query is performed based on at least one of: i) a name of the data object, ii) a semantic attribute of the data object, and iii) a catalog of the operation.

13. The system according to claim 9, wherein generating the second code for the macro-service based on the determined subset of the graph representation comprises:

merging more than one element in the determined subset of the graph representation.

14. The system according to claim 9, wherein generating the second code for the macro-service based on the determined subset of the graph representation further comprises:

resolving at least one dependency of at least one data object in the determined subset of the graph representation.

15. A computer program product for automatically creating a macro-service, the computer program product comprising a computer readable storage medium having program instructions embodied therewith, wherein the program instructions being executable by a device to perform a method comprising:

converting, by the device, pre-existing source code of an analytic program to accomplish a first analytic task comprising a first set of operation units into a graph representation, wherein each of the first set of operation units performs at least one first operation on a first data object;

performing a query associated with the macro-service on the graph representation to determine a subset of the graph representation of the pre-existing code, the subset including the at least one first operation; and generating, by the device, second code differing from the pre-existing source code for the macro-service based on the determined subset of the graph representation, wherein the macro-service comprises a reusable and deployable second set of operation units for performing at least one second operation on a second data object to accomplish a second analytic task differing from the first analytic task, wherein the at least one second operation of the second set of operations differs from the at least one first operation of the first set of operations; and deploying the second code on the processor.

16. The computer program product according to claim 15, wherein converting pre-existing source code of the analytic program to the graph representation comprises:

providing a plurality of nodes in the graph representation, wherein each of the plurality of nodes represents an operation corresponding to at least one of the first set of operation units;

determining a type of each of the plurality of nodes based on a catalog of the operation corresponding to at least one of the first set of operation units; and for at least two of the plurality of nodes, if there is a dependency of one or more data objects for one or more respective operation units of the first set of operation units associated with the two nodes, providing a directed edge between the two nodes.

17. The computer program product according to claim 16, wherein the one or more data objects includes a DataFrame, and wherein the catalog of the operation comprises at least one of i) a read-only operation, ii) a modification operation or iii) control logic with respect to the DataFrame.

18. The computer program product according to claim 15, wherein the query is performed based on at least one of: i) a name of the data object, ii) a semantic attribute of the data object, and iii) a catalog of the operation.

19. The computer program product according to claim 15, wherein generating code for the macro-service based on the determined subset of the graph representation comprises:

merging more than one element in the determined subset of the graph representation.

20. The computer program product according to claim 15, wherein generating code for the macro-service based on the determined subset of the graph representation further comprises:

resolving at least one dependency of at least one data object in the determined subset of the graph representation.

* * * * *